US006655777B2

(12) United States Patent
Adkins et al.
(10) Patent No.: US 6,655,777 B2
(45) Date of Patent: Dec. 2, 2003

(54) AUTOMATIC HORIZONTAL AND VERTICAL HEAD-TO-HEAD ALIGNMENT METHOD AND SENSOR FOR AN INK JET PRINTER

(75) Inventors: Christopher Alan Adkins, Lexington, KY (US); Adam Jude Ahne, Lexington, KY (US); Mark Joseph Edwards, Lexington, KY (US); Michael Anthony Marra, III, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 21 days.

(21) Appl. No.: 09/907,775

(22) Filed: Jul. 18, 2001

(65) Prior Publication Data

US 2003/0113152 A1 Jun. 19, 2003

(51) Int. Cl.[7] ......................... B41J 29/393; B41J 21/16; B41J 29/38; G01N 21/86; G01V 8/00

(52) U.S. Cl. ........................... 347/19; 347/14; 400/279; 250/559.01; 250/559.04

(58) Field of Search ............................ 400/279; 347/19, 347/14; 250/559.01, 559.04

(56) References Cited

U.S. PATENT DOCUMENTS 3,810,194 A * 5/1974 Tokunaga et al. ............. 347/19
4,067,019 A * 1/1978 Fleischer et al. ............. 347/81
4,323,905 A * 4/1982 Reitberger et al. ............. 347/6
4,509,057 A * 4/1985 Sohl et al. ..................... 347/14
4,737,803 A 4/1988 Fujimura et al. ........... 346/140
4,768,045 A * 8/1988 Koto ........................... 347/19
4,797,688 A 1/1989 Furukawa ....................... 347/6
4,818,129 A 4/1989 Tanuma et al.
4,990,932 A 2/1991 Houston ...................... 347/81
5,036,340 A 7/1991 Osborne ...................... 347/19
5,040,003 A 8/1991 Willis
5,109,239 A * 4/1992 Cobbs et al. ................. 347/19
5,160,938 A 11/1992 Fargo et al.
5,160,939 A 11/1992 Bajeux et al. ................ 347/78
5,164,747 A 11/1992 Osada et al. ................ 346/140
5,534,895 A 7/1996 Lindenfelser et al.
5,561,449 A 10/1996 Raskin et al.
5,721,574 A 2/1998 Kubby ........................... 347/7
5,739,832 A * 4/1998 Heinzl et al. ................. 347/68
5,751,305 A 5/1998 Hadley
5,771,051 A 6/1998 Guenther et al.
5,796,414 A * 8/1998 Sievert et al. ................ 347/19
5,815,175 A * 9/1998 Seikel ......................... 347/19
5,847,722 A 12/1998 Hackleman
5,883,646 A 3/1999 Beauchamp
5,914,733 A 6/1999 Sato et al.
5,929,875 A * 7/1999 Su et al. ........................ 347/19
5,936,645 A 8/1999 Niikura et al. ................ 347/14
5,975,674 A 11/1999 Beauchamp et al.
5,984,455 A 11/1999 Anderson .................... 347/47
5,992,984 A * 11/1999 Imanaka et al. .............. 347/65
5,995,067 A 11/1999 Terasawa et al. ............. 345/23
6,007,173 A 12/1999 DeLouise et al. .............. 347/7
6,010,201 A 1/2000 Shimoda
6,039,429 A 3/2000 Balousek ..................... 347/19
6,062,668 A 5/2000 Cruz-Uribe .................. 347/19
6,109,721 A 8/2000 Kim
6,109,722 A 8/2000 Underwood et al.
6,250,735 B1 * 6/2001 Kaneko et al. ............... 347/19
6,299,275 B1 * 10/2001 Elgee .......................... 347/19
6,378,978 B1 * 4/2002 Chang et al. ................. 347/19
6,398,334 B2 * 6/2002 Dunand ....................... 347/14

* cited by examiner

*Primary Examiner*—Judy Nguyen
*Assistant Examiner*—Leonard Liang
(74) *Attorney, Agent, or Firm*—Scott N. Barker; Taylor & Aust, P.C.

(57) ABSTRACT

A printhead alignment sensor for an ink jet printer includes at least two terminals defining a gap therebetween. An electrical measuring device detects a change in an electrical parameter between two of the terminals when ink is in the gap between the at least two terminals.

17 Claims, 12 Drawing Sheets

AUTOMATIC HORIZONTAL AND VERTICAL HEAD-TO-HEAD ALIGNMENT METHOD AND SENSOR FOR AN INK JET PRINTER

BACKGROUND OF THE INVENTION

1. Field of the Invention

The present invention relates to an ink jet printer, and, more particularly, to a head-to-head alignment method and sensor for an ink jet printer.

2. Description of the Related Art

Many inkjet printers contain two printheads mounted to the same carrier. For example, one printhead can be monochrome only and the other printhead can be color only. Both printheads can be used on the same printed image. The monochrome printhead provides the saturated black and the color printhead provides all other colors. The dots fired by the two heads must be precisely aligned, horizontally and vertically, or else print quality defects will be seen. For example, the black and color dots will overlap and unprinted white areas will remain.

Vertical alignment errors cause vertical offsets between horizontal lines printed by each printhead. Horizontal alignment errors cause horizontal offsets between vertical lines printed by each printhead.

Many printers to date include a manual method of performing horizontal and vertical head-to-head alignment. Usually, this includes the printer driver printing a test page which includes a continuum of alignment possibilities, and having the user manually type-in at their personal computer a number or letter representing the pattern having the best alignment. From this input, the driver saves timing offsets to allow horizontal head-to-head alignment. Vertical alignment is achieved by moving the printed swath vertically within a printhead. A small percentage of the printhead nozzles are unused to allow the swath to be moved vertically.

What is needed in the art is an automatic, rather than manual, head-to-head alignment process, which removes the burden from the user.

SUMMARY OF THE INVENTION

The present invention provides a simple, low-cost, head-to-head alignment sensor and a simple, automatic head-to-head alignment method.

The invention comprises, in one form thereof, a printhead alignment sensor for an ink jet printer. At least two terminals define a gap therebetween. An electrical measuring device detects a change in an electrical resistance between two of the terminals when ink is in the gap between the at least two terminals.

The invention comprises, in another form thereof, a method of horizontally aligning a first printhead and a second printhead in an ink jet printer. A substrate having a target area with a width approximately equal to a width of an ink drop is provided. A carrier of the first printhead is moved from a first location toward the target area. A plurality of aligned first ink drops are jetted from the first printhead when the carrier of the first printhead is at a first jetting location. The aligned first ink drops are substantially parallel to the target area. It is sensed whether at least one of the first ink drops has been jetted onto the target area. The carrier of the first printhead is returned to the first location. The moving, jetting, sensing and returning steps are repeated until at least one of the first ink drops has been jetted onto the target area. The jetting steps are performed at various first jetting locations. A first reference location of the carrier of the first printhead is recorded. The first reference location is a location of the carrier of the first printhead when it is sensed that at least one of the first ink drops has been jetted onto the target area. A carrier of the second printhead is moved from a second location toward the target area. A plurality of aligned second ink drops are jetted from the second printhead when the carrier of the second printhead is at a second jetting location. The aligned second ink drops are substantially parallel to the target area. It is sensed whether at least one of the second ink drops has been jetted onto the target area. The carrier of the second printhead is returned to the second location. The moving, jetting, sensing and returning steps are repeated until at least one of the second ink drops has been jetted onto the target area. The jetting steps are performed at various second jetting locations. A second reference location of the carrier of the second printhead is recorded. The second reference location is a location of the carrier of the second printhead when it is sensed that at least one of the second ink drops has been jetted onto the target area. At least one offset is calculated based upon the first reference location and the second reference location.

An advantage of the present invention is that printhead-to-printhead alignment can be performed automatically, rather than manually. That is, alignment can be performed without printing a test page. No user interaction is required. The alignment may take place automatically as soon as a new printhead is identified as having been installed.

Another advantage is that the method allows high accuracy of alignment at little cost. The sensing circuit requires just a few low cost components. Also, the cost of the sensor is much less than that of a reflective, optical type sensor.

Yet another advantage is that only a rough alignment of the sensor in the printer is required for ease of printer manufacturing assembly.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate one preferred embodiment of the invention, in one form, and such exemplifications are not to be construed as limiting the scope of the invention in any manner.

DETAILED DESCRIPTION OF THE INVENTION

Figure 1:
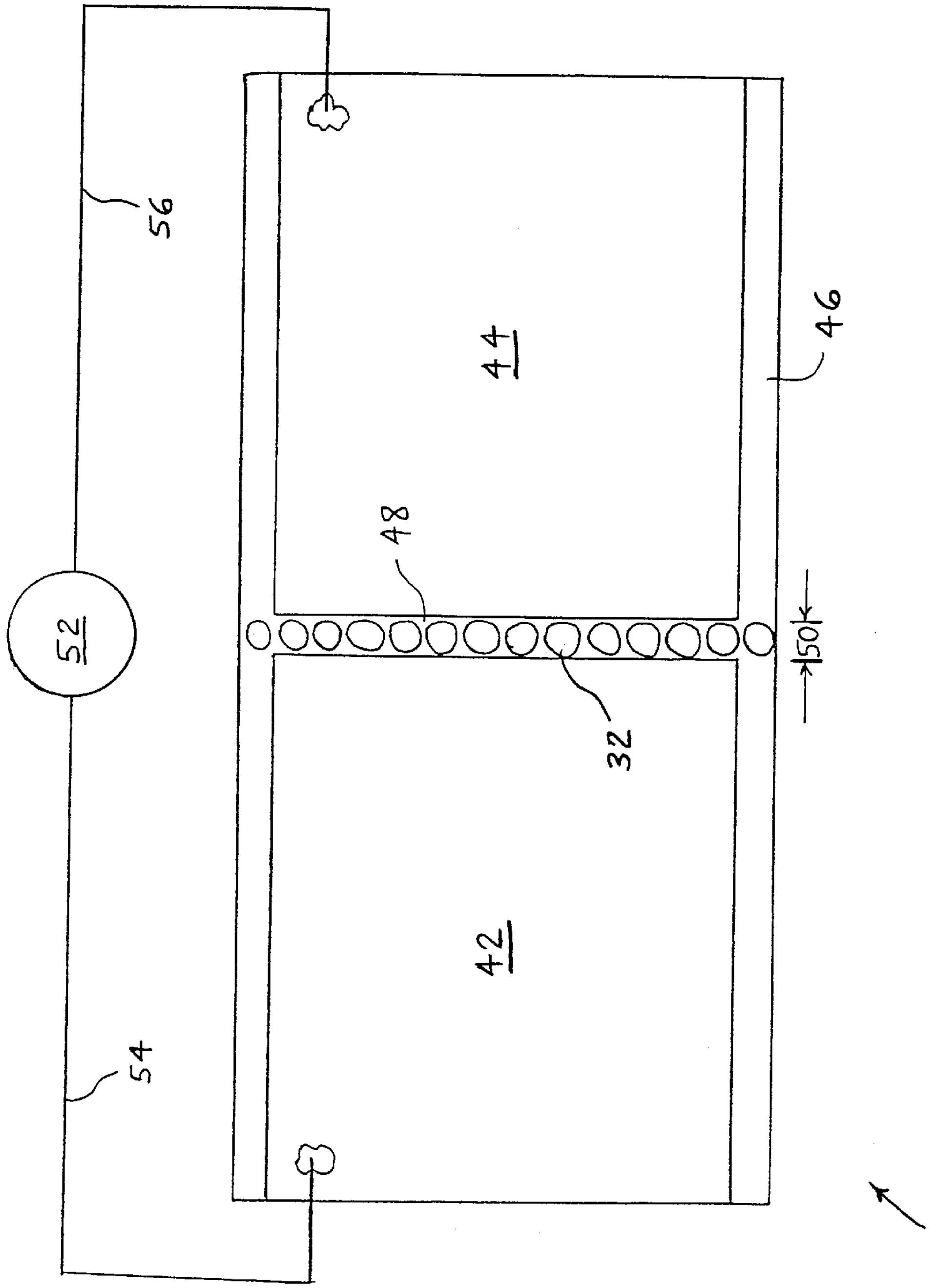
FIG. 1 is an overhead schematic view of one embodiment of a slotted sensor of the present invention.

In FIG. 1 there is shown one embodiment of a slotted sensor 40 of the present invention, including two copper terminals 42, 44 on a mylar substrate 46. Terminals 42, 44 are separated by a gap 48 having a width 50 of approximately 1/600-inch, which is approximately the width of an ink droplet 32. Gap 48 can be formed by laser cutting. An ohmmeter 52 has leads 54, 56 connected to terminals 42, 44, respectively, to measure the resistance therebetween. When no ink drops 32 are between terminals 42 and 44, the resistance between terminals 42 and 44 is many hundreds of megohms. If a single column of ink dots 32 is printed from a printhead substantially into gap 48, as illustrated in FIG. 1, the resistance between terminals 42, 44 drops into the range of approximately between 0.5 and 3 megohms. Printing this column of ink drops 32 even one print element (pel) off-center of gap 48 leaves the resistance between terminals 42, 44 at several hundred megohms. One pel is defined herein as the width of one ink droplet. Once printed in gap 48, the ink evaporates within a few seconds (this is due to the conductive nature of the ink, and the heat generated by the ohmmeter current through it), and the resistance returns to several hundred megohms. Thus, slotted sensor 40 is re-usable, i.e., it may be used for several alignment print passes.

Figure 2:
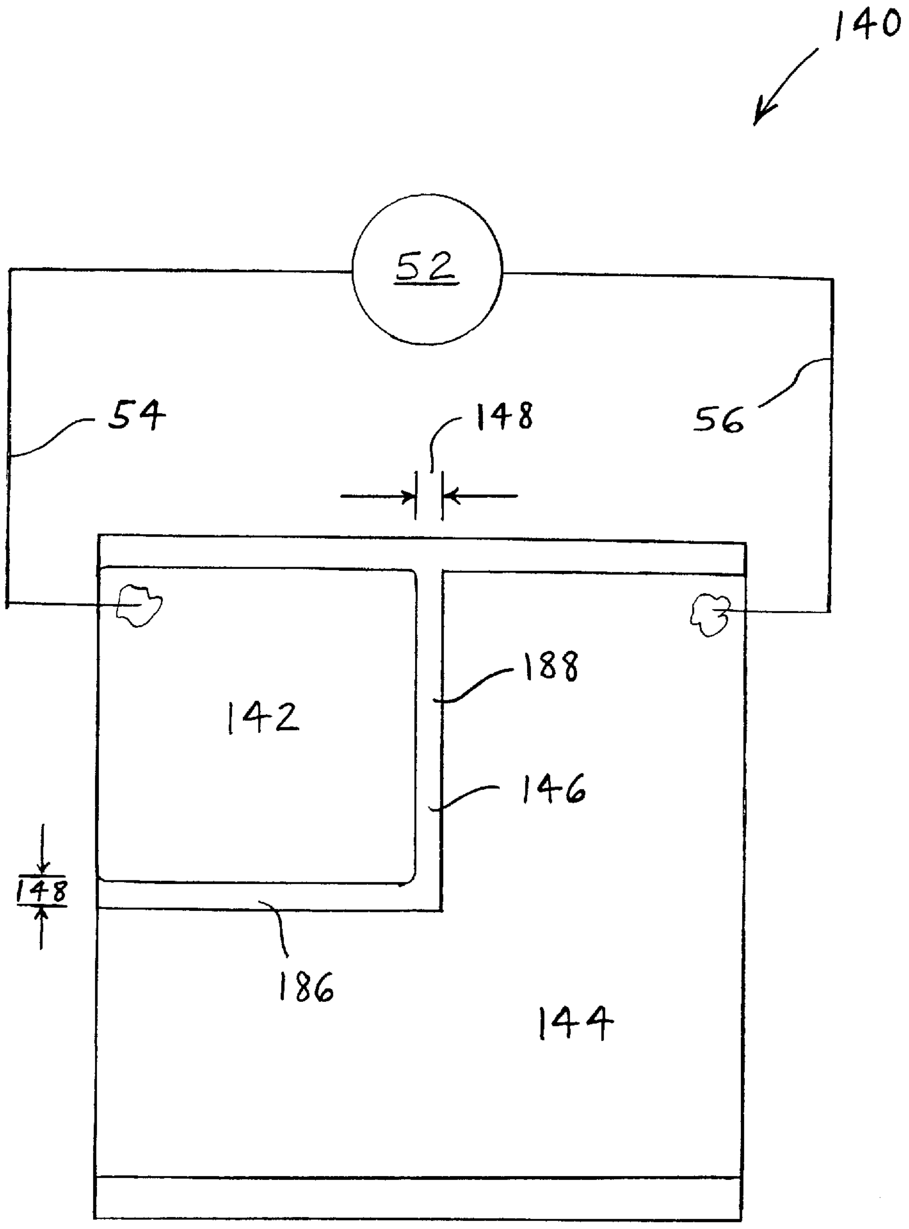
FIG. 2 is an overhead schematic view of another embodiment of a slotted sensor of the present invention.

Sensor 40 can be rotated 90 degrees in order to sense a horizontal row of ink dots instead of a vertical column of ink dots. Thus, two different sensors could be used, one sensor sensing a vertical column of ink dots aligned in the paper feed direction and another sensor sensing a horizontal row of ink dots aligned in the scan direction. The two sensors could be combined into a single sensor 140 (FIG. 2) including terminals 142, 144 separated by an L-shaped gap 146 having a width 148 of approximately 1/600-inch. Thus, sensor 140 can sense both horizontal rows of ink dots and vertical columns of ink dots. Gap 146 has a horizontal section 186 oriented in a scan direction of a printhead, and a vertical section 188 oriented in a paper feed direction of the printer.

Figure 3:
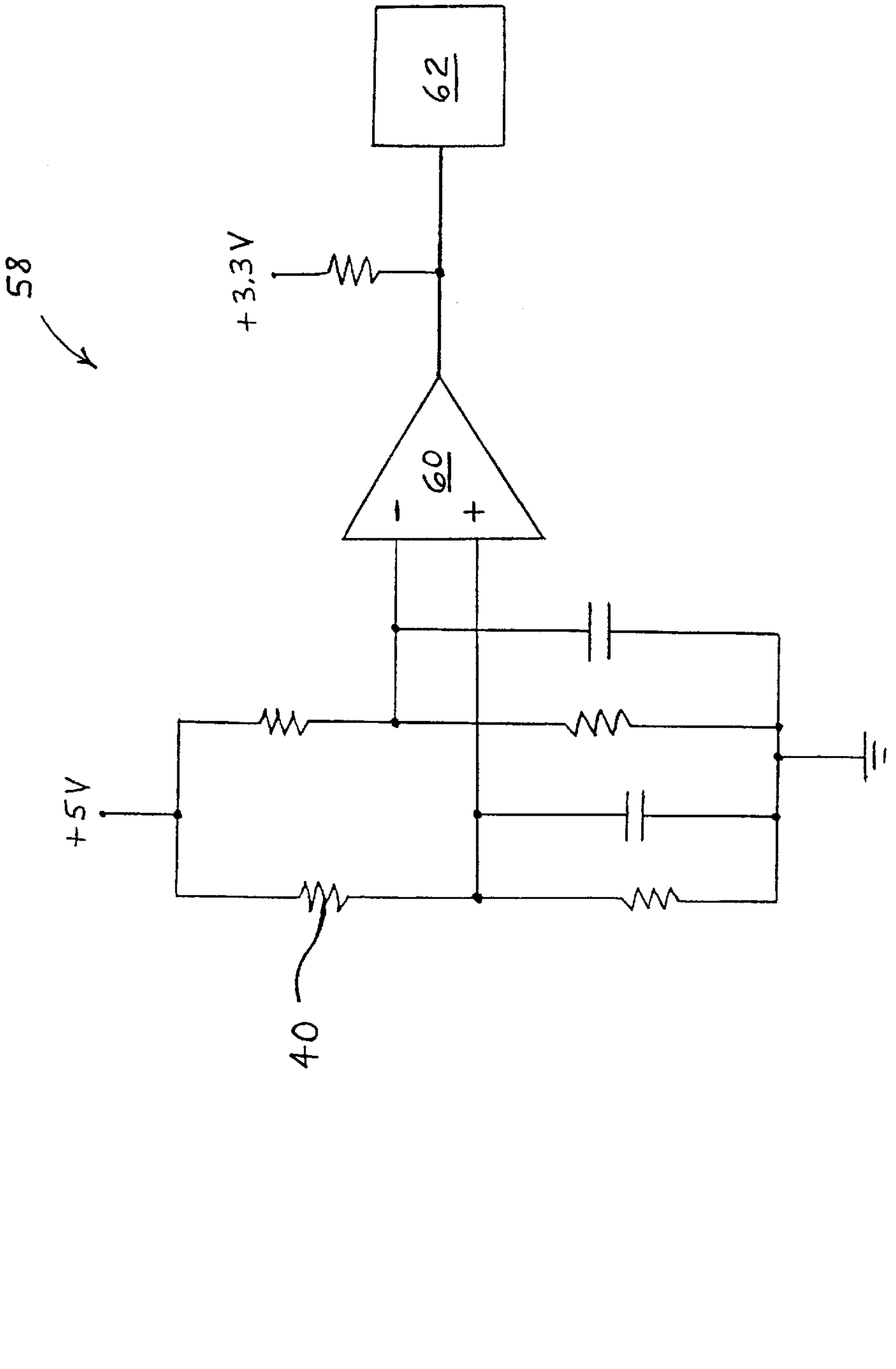
FIG. 3 is a schematic view of one embodiment of a sensing circuit in which the sensor of FIG. 1 can be incorporated.

Slotted sensor 40 can be incorporated in a sensing circuit 58, as shown in FIG. 3. The resistance of sensor 40 is used in a resistor divider in a comparator circuit such that its change from several hundred megohms to just a few megohms causes the output of comparator 60 to go high. This output is fed to the printer application specific integrated circuit (ASIC) 62 to indicate that the printed dot column has been printed in gap 48 of sensor 40.

Figure 4:
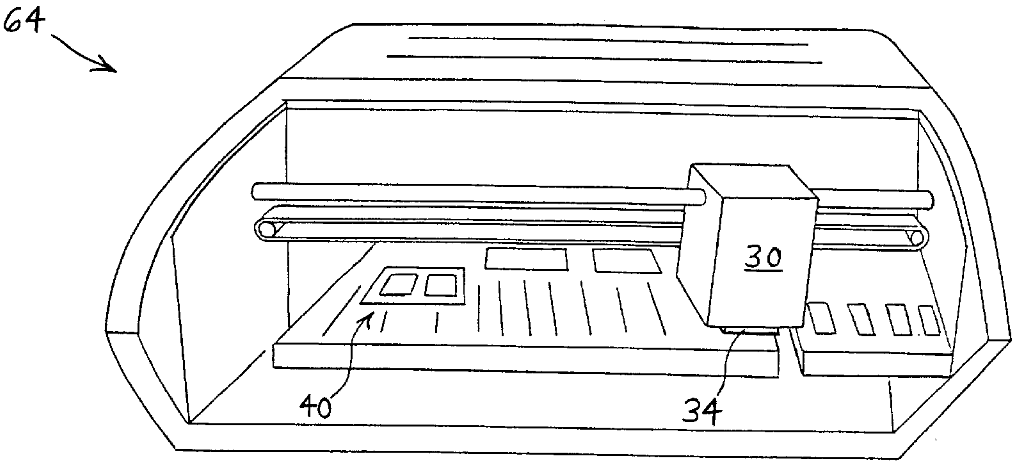
FIG. 4 is a front, sectional, perspective view of an ink jet printer including the sensing circuit of FIG. 3.

One embodiment of the horizontal head-to-head alignment method of the present invention includes positioning sensor 40 in the horizontal print path of carrier 30 (FIG. 4), in an approximate position specified in software. This approximate position of sensor 40 within an ink jet printer 64 is typically known to perhaps 1/8-inch.

Figure 5:
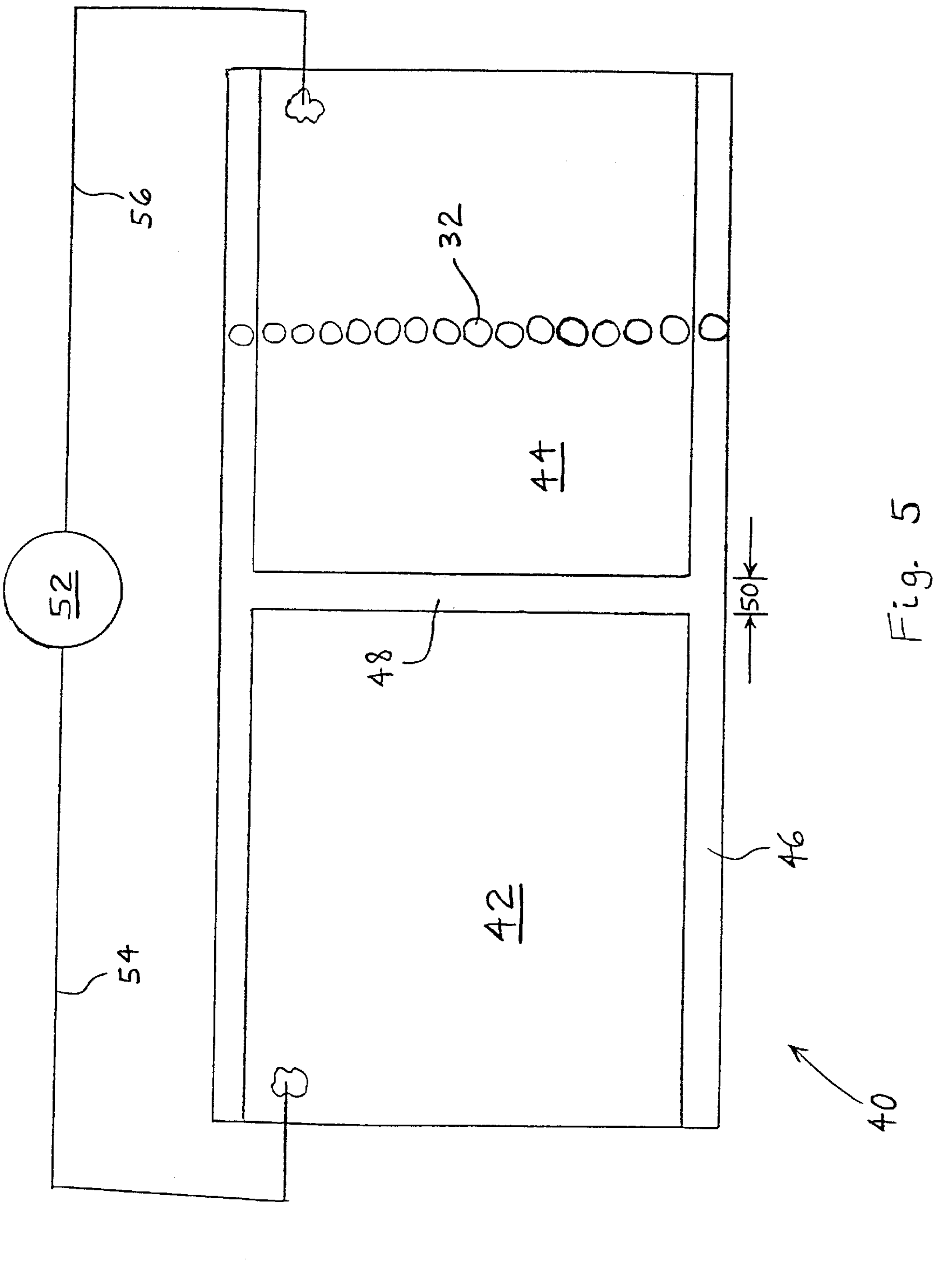
FIG. 5 is an overhead schematic view of the slotted sensor of FIG. 1 with a column of dots printed to the right of the gap.

In a next step of the method, carrier 30 moves leftward, and printer 64, using a first printhead 34, prints a single-pel-wide column of dots 32 somewhat to the right of sensor gap 48, as shown in FIG. 5. The column of dots can be printed just to the right of the left edge of terminal 44, perhaps several pels away from gap 48, but in an amount that is known to ensure that the column will be positioned to the right of gap 48. Carrier 30 is then returned to the far right.

With carrier 30 again moving leftward, printer 64, using the first printhead 34, prints a single-pel-wide column of dots one pel further to the left than the previous column. Sensor 40 is monitored by ohmmeter 52 to determine whether the column is printed in gap 48, or on the left edge of terminal 44. If not, carrier 30 is returned to the far right and the above procedure is repeated such that increasingly leftward columns of dots are printed until gap 48 or the left edge of terminal 44 is located. If gap 48 or the left edge of terminal 44 is not located within a maximum number of tries, a dead sensor or other error is indicated.

Once gap 48 has been located, a known encoder position is recorded as the position carrier 30 must be in to print within sensor gap 48 with the first printhead 34. Carrier 30 is then returned to the far right position.

In a next step of the method, carrier 30 moves leftward, and printer 64, using a second printhead 34, prints a single-pel-wide column of dots 32 somewhat to the right of sensor gap 48, as shown in FIG. 5. The column of dots can be printed just to the right of the left edge of terminal 44, perhaps several pels away from gap 48, but in an amount that is known to ensure that the column will be positioned to the right of gap 48. Carrier 30 is then returned to the far right.

With carrier 30 again moving leftward, printer 64, using second printhead 34, prints a single-pel-wide column of dots one pel further to the left than the previous column. Sensor 40 is monitored by ohmmeter 52 to determine whether the column is printed in gap 48, or on the left edge of terminal 44. If not, carrier 30 is returned to the far right and the above procedure is repeated such that increasingly leftward columns of dots are printed until gap 48 or the left edge of terminal 44 is located. If gap 48 or the left edge of terminal 44 is not located within a maximum number of tries, a dead sensor or other error is indicated.

Once gap 48 has been located, a known encoder position is recorded as the position carrier 30 must be in to print within sensor gap 48 with the second printhead 34. Offsets are calculated based on the encoder positions recorded for the first printhead 34 and the second printhead 34 and are used to correct subsequent print swaths. If the sensor is of the non-reusable type, separate sensors can be used for the first printhead and the second printhead. In this case, the separate sensors' positions must be known to within a desired degree of tolerance.

One embodiment of the vertical head-to-head alignment method of the present invention includes positioning sensor 40 in the horizontal print path of carrier 30 (FIG. 4), in an approximate position specified in software. This approximate position of sensor 40 within an ink jet printer 64 is typically known to perhaps 1/8-inch.

Figure 6:
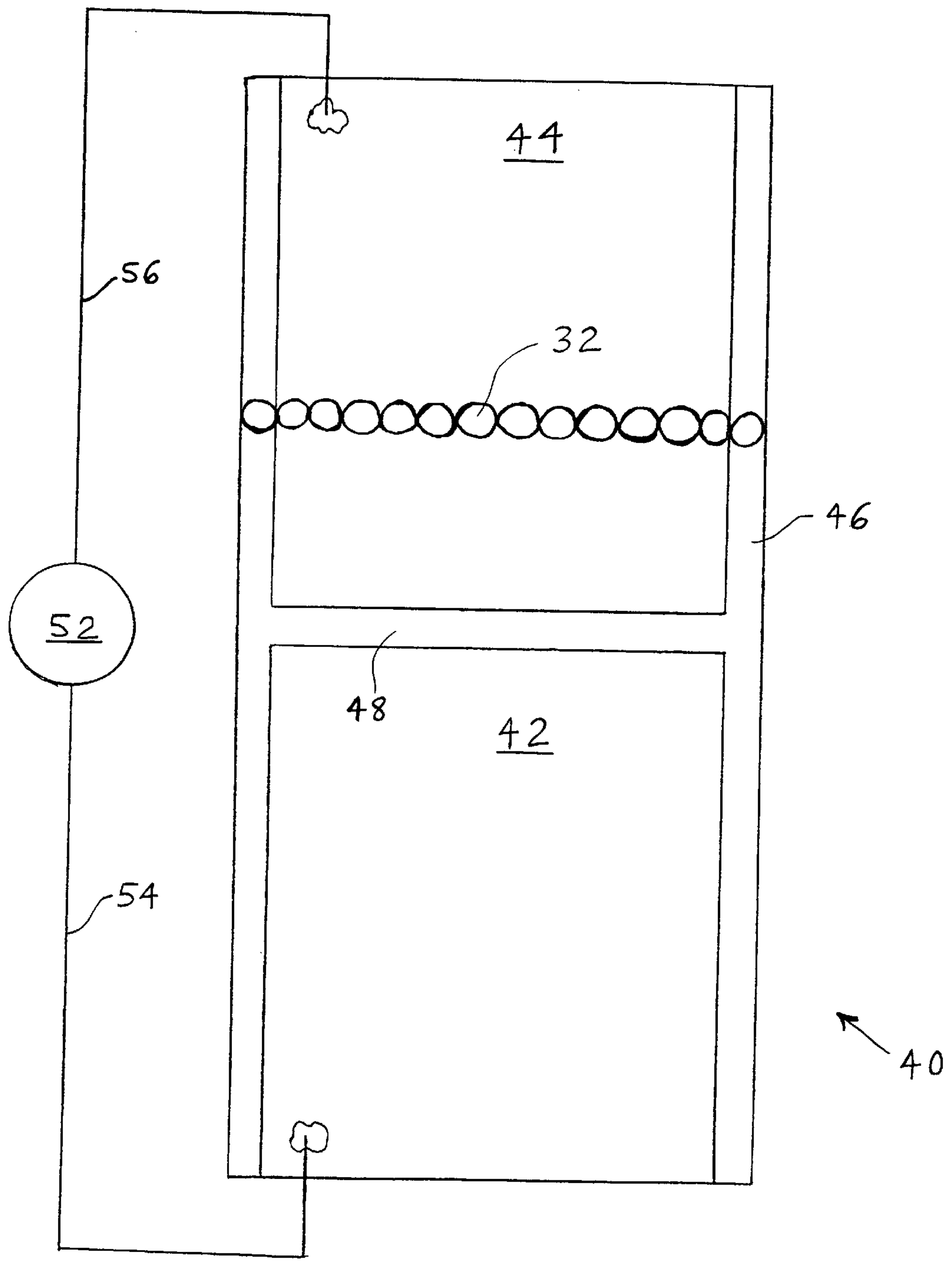
FIG. 6 is an overhead schematic view of the slotted sensor of FIG. 1, rotated 90 degrees and with a row of dots printed above the gap.

A row of dots are printed on sensor 40 using first printhead 34, at a y-direction coordinate (in the paper feed direction) that is known to be above the detecting area of sensor 40, as shown in FIG. 6. For many printheads, a row is printed by firing only one nozzle as the carrier is moved.

Another row of dots are then printed on sensor 40 using the first printhead 34, at a y-direction coordinate one dot lower than the previous row. Sensor 40 is monitored by ohmmeter 52 to determine whether the row is substantially printed in gap 48, or on the bottom edge of terminal 44. If not, the above procedure is repeated such that increasingly downward rows of dots are printed until gap 48 or the bottom edge of terminal 44 is located. If gap 48 or the bottom edge of terminal 44 is not located with the lowest nozzle of the printhead, a dead sensor or other error is indicated.

Once gap 48 has been located, a known nozzle position, i.e., y-direction coordinate, is recorded as the position carrier 30 must be in to print within sensor gap 48 with the first printhead 34.

In a next step of the method, printer 64, using a second printhead 34, prints a single-pel-high row of dots 32 somewhat above sensor gap 48, as shown in FIG. 6. The row of dots can be printed just above the bottom edge of terminal 44, perhaps several pels away from gap 48, but in an amount that is known to ensure that the row will be positioned above gap 48.

Printer 64, using second printhead 34, then prints a single-pel-high row of dots one pel further downward than the previous row. Sensor 40 is monitored by ohmmeter 52 to determine whether the row is substantially printed in gap 48, or on the bottom edge of terminal 44. If not, the above procedure is repeated such that increasingly downward rows of dots are printed until gap 48 or the bottom edge of terminal 44 is located. If gap 48 or the bottom edge of terminal 44 is not located with the lowest nozzle of the printhead, a dead sensor or other error is indicated.

Once gap 48 has been located, a known nozzle position is recorded as the position carrier 30 must be in to print within sensor gap 48 with the second printhead 34. Offsets are calculated based on the nozzle positions recorded for the first printhead 34 and the second printhead 34 and are used to correct subsequent print swaths. If the sensor is of the non-reusable type, separate sensors can be used for the first printhead and the second printhead. In this case, the separate sensor positions must be known within a desired tolerance.

A single-pel-width ink jet column print sensor can be formed in many ways. Each column sensor can be rotated 90 degrees and used as a row sensor, with a corresponding change in "x positions" to "y positions".

Figure 7:
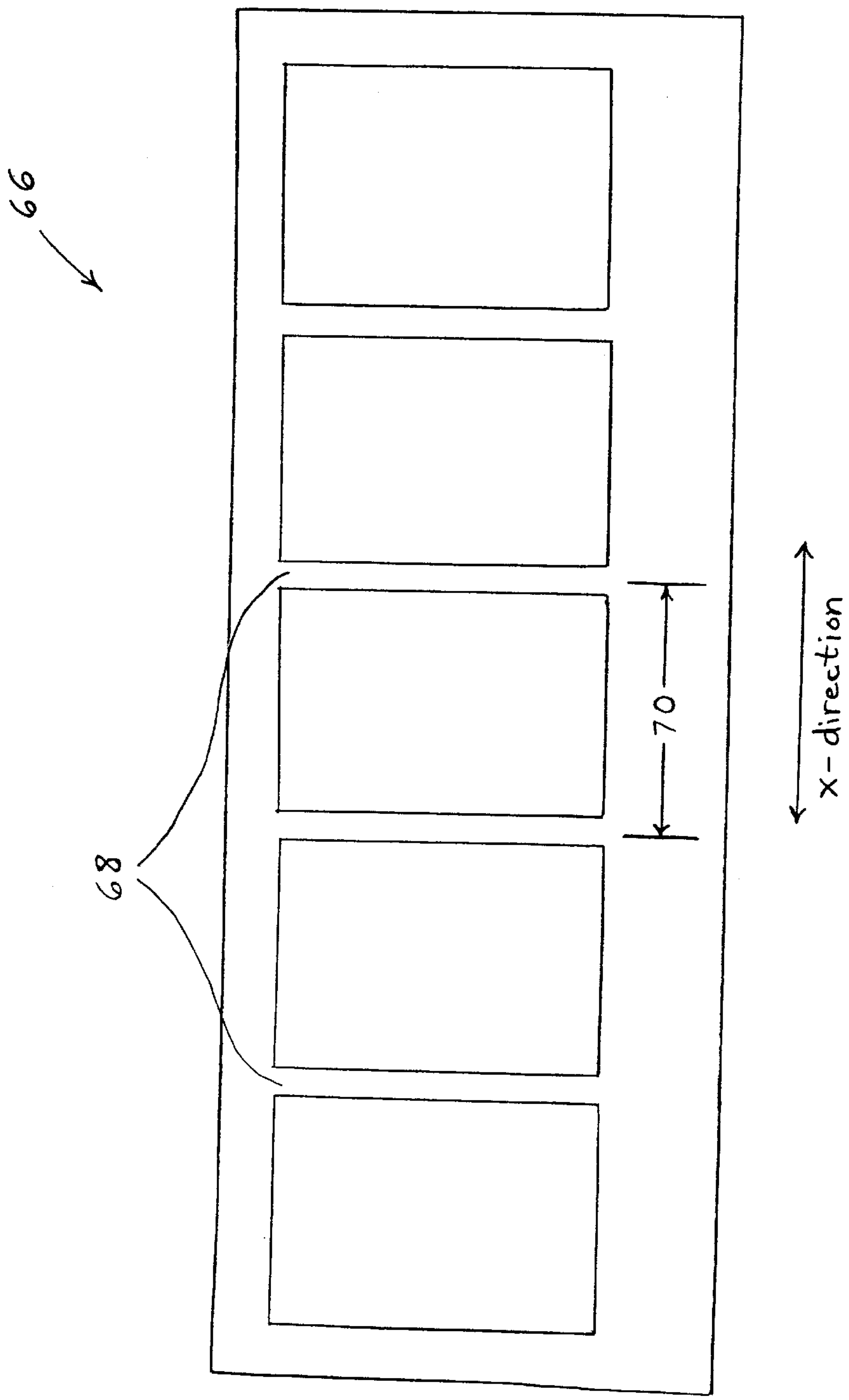
FIG. 7 is an overhead schematic view of another embodiment of a slotted sensor of the present invention.

In another embodiment, a non-reusable gap resistance sensor 66 (FIG. 7) has two or more gap positions. Each gap 68 is one pel wide and is separated from adjacent gaps 68 by a distance, for example, distance 70, in an x-direction. Distance 70 is equal to an integer multiple of the width of a pel. Sensor 66 can be used in the orientation shown as a vertical column sensor. Alternatively, sensor 66 can be rotated 90 degrees and used as a horizontal row sensor.

Figure 8:
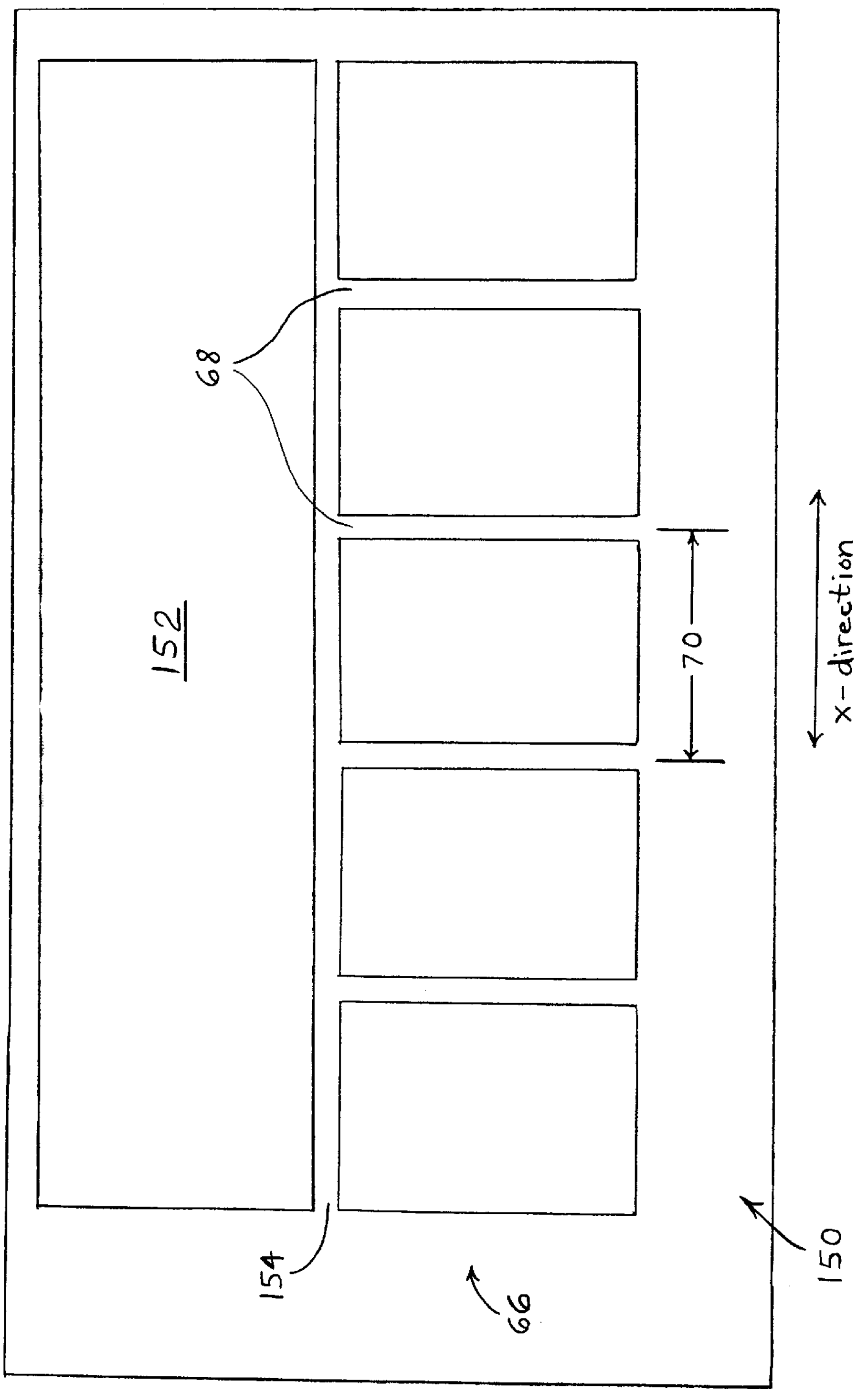
FIG. 8 is an overhead schematic view of yet another embodiment of a slotted sensor of the present invention.

In yet another embodiment, a sensor 150 (FIG. 8) is formed by adding an elongate terminal 152 above sensor 66. A horizontal gap 154 between terminal 152 and sensor 66, along with vertical gaps 68, enables sensor 150 to detect both horizontal rows of ink dots and vertical columns of ink dots.

Figure 9:
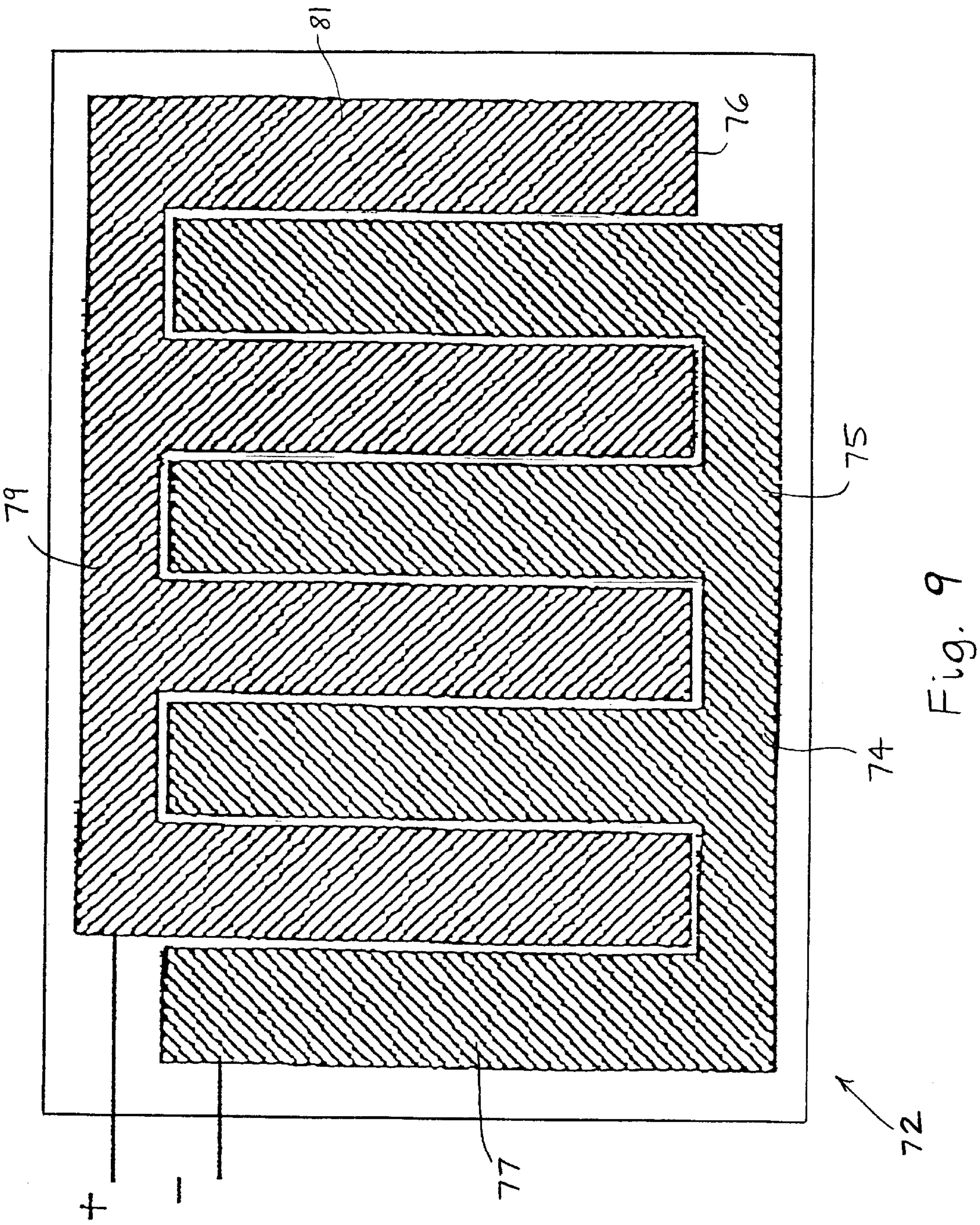
FIG. 9 is an overhead schematic view of a further embodiment of a slotted sensor of the present invention.

In yet another embodiment, a redundant sensor 72 (FIG. 9) operates similarly to sensor 40. Terminal 74 includes a base 75 with tines 77 extending therefrom. Similarly, terminal 76 includes a base 79 with tines 81 extending therefrom. The resistance between terminals 74 and 76 is reduced when an ink dot column is aligned in a gap between tines 77 and 81. Similarly, the resistance between terminals 74 and 76 is reduced when an ink dot row is aligned between base 75 and the distal ends of tines 81, or between base 79 and the distal ends of tines 77. Thus, like the sensors of FIGS. 2 and 8, sensor 72 of FIG. 9 can be used for both vertical and horizontal alignment. The method used in conjunction with sensor 72 is similar to that described above except that multiple columns are printed on each pass.

Figure 10:
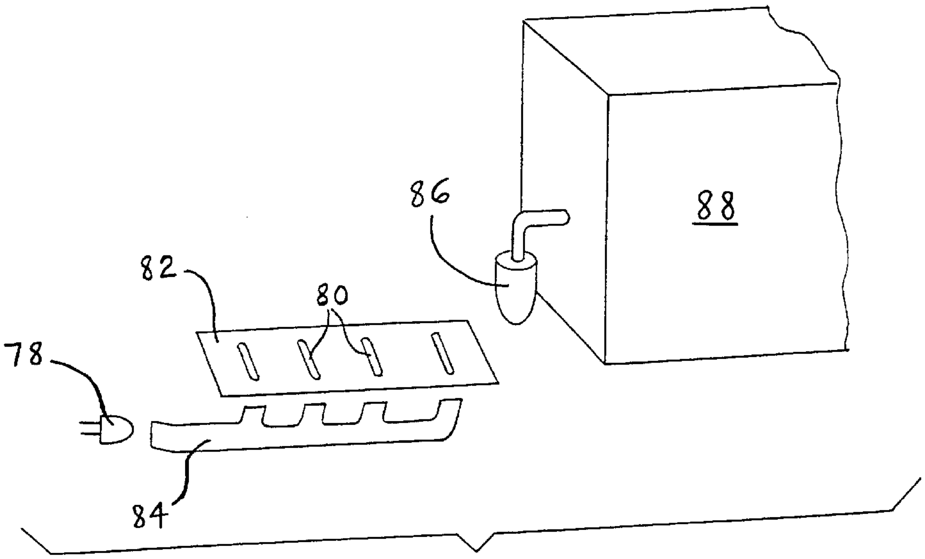
FIG. 10 is an exploded, perspective view of a still further embodiment of a slotted sensor of the present invention.

In a further embodiment of a vertical column detector (FIG. 10), an LED emitter 78 shines light through one-pel-wide transparent areas 80 in an opaque cover 82 via a light pipe 84, and the light is sensed with a detector 86 mounted on a carrier 88. A one-pel-wide column of ink drops is printed on cover 82 over an area 80, blocking the light. When the light is blocked, the print position in the x-direction is known. Each area 80 is separated from adjacent areas 80 by an integer multiple number of pel widths.

Figure 11:
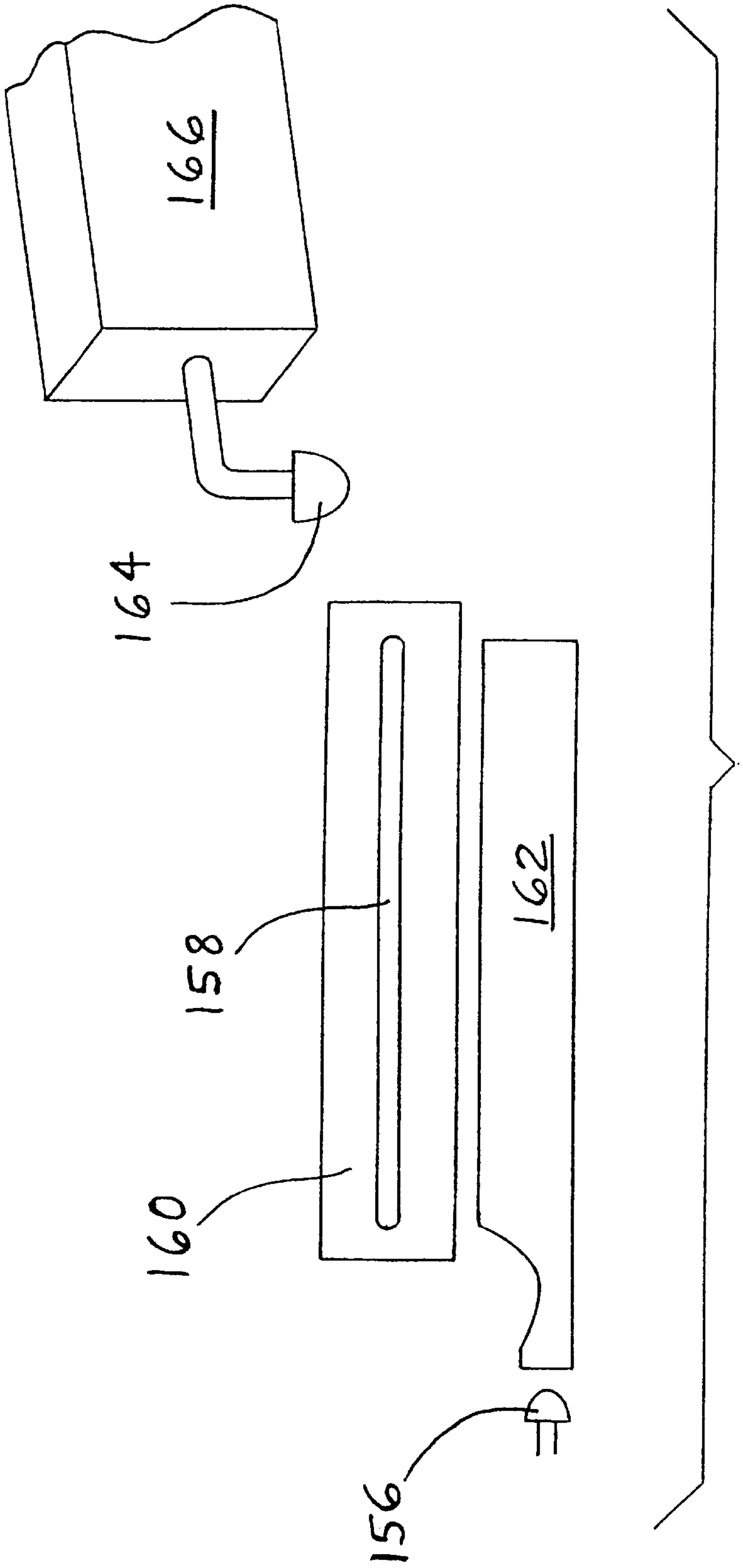
FIG. 11 is an exploded, perspective view of another embodiment of a slotted sensor of the present invention.

In an embodiment of a horizontal row detector (FIG. 11), an LED emitter 156 shines light through a single one-pel-high transparent horizontal area 158 in an opaque cover 160 via a light pipe 162, and the light is sensed with a detector 164 mounted on a carrier 166. Dots are printed on a section of area 158, and then carrier 166 is moved so that detector 164 is positioned over the section currently being used.

Figure 12:
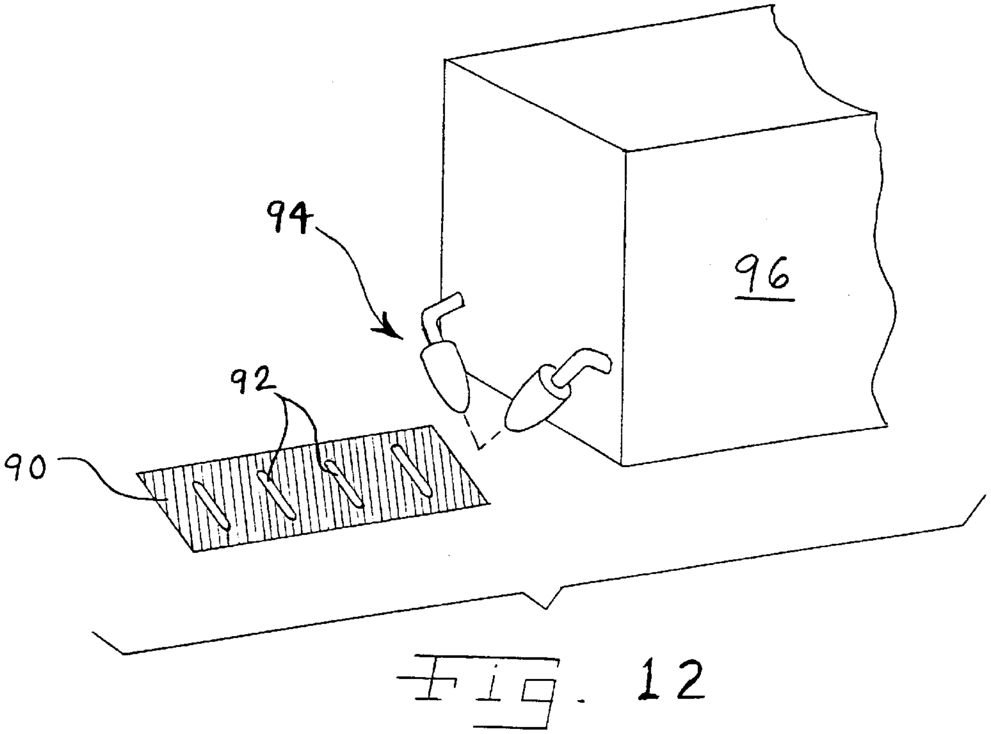
FIG. 12 is a perspective view of yet another embodiment of a slotted sensor of the present invention.

In another embodiment of a vertical column detector (FIG. 12), a black label 90 with one-pel-wide white bars 92 is sensed with a reflective sensor 94 mounted on a carrier 96. A one-pel-wide column of ink drops is printed onto one of white bars 92. When white is no longer sensed by sensor 94, the print position of carrier 96 in the x-direction is known.

Figure 13:
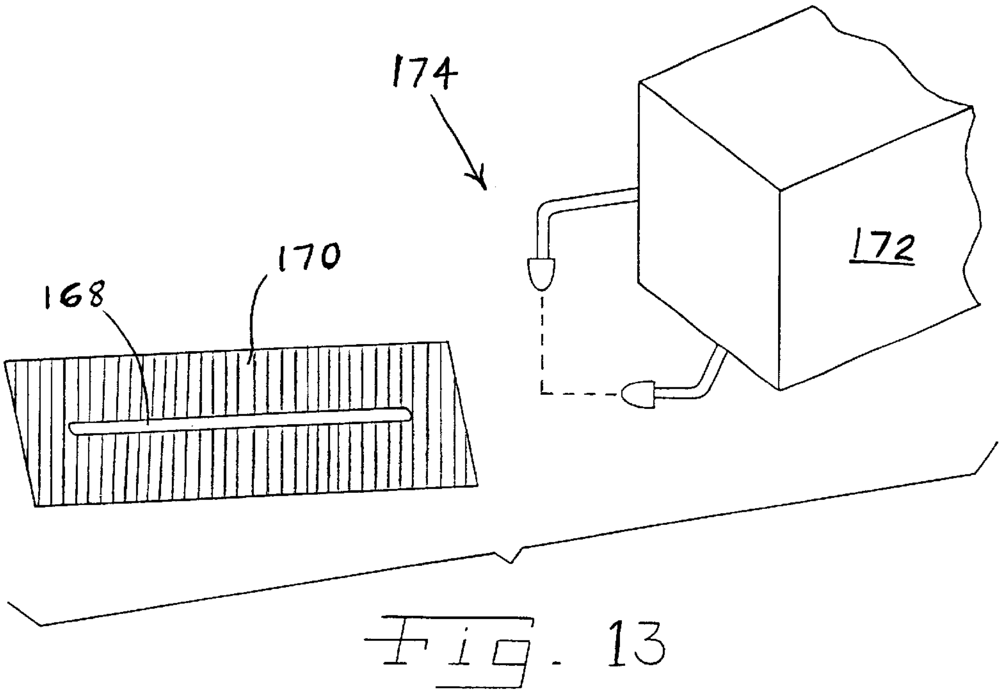
FIG. 13 is an exploded, perspective view of a further embodiment of a slotted sensor of the present invention.

In another embodiment of a horizontal row detector (FIG. 13), ink dots are printed on a section of a single, horizontal, one-pel-high white bar 168 on a black label 170, and a carrier 172 is moved so that a reflective sensor 174 is positioned over the section currently being used. When white is no longer sensed, the print position in the y-direction is known.

Figure 14:
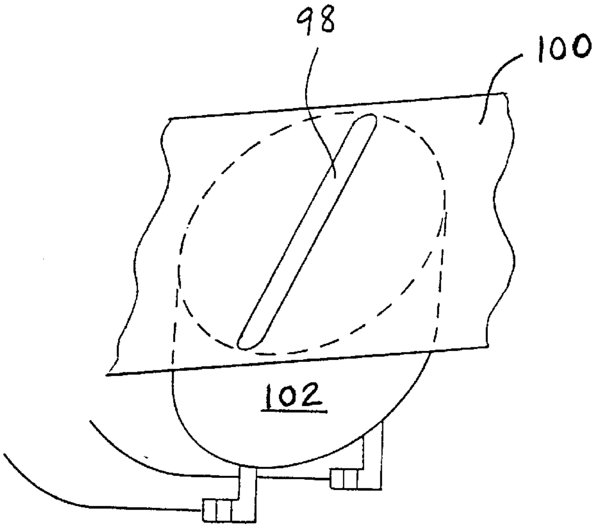
FIG. 14 is an overhead view of another embodiment of a slotted sensor of the present invention.

In another embodiment (FIG. 14), a one-pel-wide slot or opening 98 is provided in a platen 100 over a sensor 102. Thus, platen 100 functions as a mask. Sensor 102 may be pressure sensitive, vibration sensitive, or a humidity sensor. When a one-pel-wide printed column of ink drops is printed through slot 98 and impinges upon sensor 102, the print position in the x-direction is known. This detection device is reusable.

Cabling and connectors of the sensor of the primary embodiment of the present invention are simplified and cost-reduced as compared to an optical sensor because the sensor has only two terminals. The sensor base is small and can be made many-up with standard flex-cable manufacturing methods, then processed through a laser cut process to make the slot.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method of horizontally aligning a first printhead and a second printhead in an ink jet printer, said method comprising the steps of:

providing a substrate having a target area with a width approximately equal to a width of an ink drop;

moving a carrier of the first printhead from a first location toward said target area;

jetting a plurality of aligned first ink drops from the first printhead when said carrier of the first printhead is at a first jetting location, the aligned first ink drops being substantially parallel to said target area;

sensing whether at least one of said first ink drops has been jetted onto said target area;

returning said carrier of the first printhead to said first location;

repeating said moving, jetting, sensing and returning steps until at least one of said first ink drops has been jetted onto said target area, said jetting steps being performed at various said first jetting locations;

recording a first reference location of said carrier of the first printhead, said first reference location being a location of said carrier of the first printhead when it is sensed that at least one of said first ink drops has been jetted onto said target area;

moving a carrier of the second printhead from a second location toward said target area;

jetting a plurality of aligned second ink drops from the second printhead when said carrier of the second printhead is at a second jetting location, the aligned second ink drops being substantially parallel to said target area;

sensing whether at least one of said second ink drops has been jetted onto said target area;

returning said carrier of the second printhead to said second location;

repeating said moving, jetting, sensing and returning steps until at least one of said second ink drops has been jetted onto said target area, said jetting steps being performed at various said second jetting locations;

recording a second reference location of said carrier of the second printhead, said second reference location being a location of said carrier of the second printhead when it is sensed that at least one of said second ink drops has been jetted onto said target area; and calculating at least one offset based upon said first reference location and said second reference location.

2. The method of claim 1, wherein said jetting of said first ink drops occurs while said carrier of the first printhead is in motion, said jetting of said second ink drops occurring while said carrier of the second printhead is in motion.

3. The method of claim 1, comprising the further step of supporting a pair of terminals on said substrate, said terminals defining said target area therebetween, said sensing step including measuring an electrical parameter between said terminals.

4. The method of claim 1, comprising the further step of allowing said first ink on said target area to at least one of dry and evaporate before said step of jetting a plurality of aligned second ink drops.

5. The method of claim 1, comprising the further step of using said at least one offset to correct at least one subsequent print swath.

6. The method of claim 1, wherein each said first jetting location is closer to said target area than an immediately preceding said first jetting location, and each said second jetting location is closer to said target area than an immediately preceding said second jetting location.

7. The method of claim 6, wherein each said first jetting location is one pel width closer to said target area than an immediately preceding said first jetting location, each said second jetting location being one pel width closer to said target area than an immediately preceding said second jetting location.

8. The method of claim 1, wherein the target area is elongate and has a width of approximately 1 pel, said method comprising the further step of providing a sensing device for performing said sensing step.

9. A method of vertically aligning a first printhead and a second printhead in an ink jet printer, said method comprising the steps of:

providing a substrate having a target area with a height approximately equal to a width of an ink drop;

jetting a plurality of aligned first ink drops from the first printhead with a nozzle of the first printhead which is at a first y-direction coordinate such that the aligned first ink drops are substantially parallel to said target area and to a scan direction of the first printhead;

sensing whether at least one of said first ink drops has been jetted onto said target area;

repeating said jetting and sensing steps until at least one of said first ink drops has been jetted onto said target area, said jetting steps being performed with nozzles at various said first y-direction coordinates;

recording a first reference nozzle position of the first printhead, said first reference nozzle position being a position of a nozzle of the first printhead when it is sensed that at least one of said first ink drops has been jetted onto said target area;

jetting a plurality of aligned second ink drops from the second printhead with a nozzle of the second printhead which is at a second y-direction coordinate such that the aligned second ink drops are substantially parallel to said target area and to a scan direction of the second printhead;

sensing whether at least one of said second ink drops has been jetted onto said target area;

repeating said jetting and sensing steps until at least one of said second ink drops has been jetted onto said target area, said jetting steps being performed at various said second y-direction coordinates;

recording a second reference nozzle position of the second printhead, said second reference nozzle position being a position of a nozzle of the second printhead when it is sensed that at least one of said second ink drops has been jetted onto said target area; and calculating at least one offset based upon said first reference nozzle position and said second reference nozzle position.

10. The method of claim 9, comprising the further step of supporting a pair of terminals on said substrate, said terminals defining said target area therebetween, said sensing step including measuring an electrical parameter between said terminals.

11. The method of claim 10, wherein the target area is elongate and has a height of approximately 1 pel, said method comprising the further step of providing a sensing device for performing said sensing steps.

12. The method of claim 9, comprising the further step of allowing said first ink on said target area to at least one of dry and evaporate before said step of jetting a plurality of aligned second ink drops.

13. The method of claim 9, comprising the further step of using said at least one offset to correct at least one subsequent print swath.

14. The method of claim 9, wherein said first reference nozzle position is a position of said first printhead nozzle when it is sensed that said first printhead nozzle has jetted said first ink drops onto said target area.

15. The method of claim 9, wherein said second reference nozzle position is a position of said second printhead nozzle when it is sensed that said second printhead nozzle has jetted said second ink drops onto said target area.

16. The method of claim 9, wherein each said first y-direction coordinate is closer to said target area than an immediately preceding said first y-direction coordinate, and each said second y-direction coordinate is closer to said target area than an immediately preceding said second y-direction coordinate.

17. The method of claim 9, each said first y-direction coordinate is one pel height closer to said target area than an immediately preceding said first y-direction coordinate, each said second y-direction coordinate being one pel height closer to said target area than an immediately preceding said second y-direction coordinate.

* * * * *